United States Patent Office 2,693,104
Patented Nov. 2, 1954

2,693,104

MEASURING RELATIVE PERMEABILITY OF A POROUS MEDIUM TO A WETTING PHASE

Henry J. Welge and Leo A. Rapoport, Tulsa, Okla., assignors to Standard Oil Development Company, a corporation of Delaware No Drawing. Application October 27, 1949, Serial No. 123,985

2 Claims. (Cl. 73—38)

The present invention is concerned with a process for determining the relative permeability of earth formations to gases and liquids. In accordance with the present invention a substituted material is employed in the pores of the rock core in order to determine its permeability to the wetting phase.

In the prospecting for oil, bore holes are drilled into the subterranean areas until producing areas are reached. At this point various core samples of the earth's formations are taken and tested in order to determine the nature thereof. It is obvious that much desirable information can be secured from an examination of the various core samples secured. For example, the flow rates of fluids per unit time can be expressed as follows:

Flow rate unit time is equal to $$\frac{(K)(A)(P)}{(Vis.)(L)}$$

wherein K represents permeability, A represents cross-sectional area, P represents pressure drop, Vis. represents viscosity of the fluid at existing temperatures and pressures and L represents length of area to be traversed. Permeability is a function of pore diameter and porosity. Porosity is equal to pore volume divided by actual volume of sample. Thus when two phases are present in a formation, as for example an oil phase and a gas phase, it is very desirable to know the flow rates of these particular phases in the particular formation. It is also obvious that this can only be secured provided knowledge is available of the permeability of the formation to oil and to gas. This information is very desirable since many oil fields operate under a dissolved gas drive or under a gas cap drive. Having the above information it may be determined to what extent the total fraction of the oil in the producing field will be recovered by these procedures. Due to the much lower viscosity of the gas as compared to the oil, once gas flow from the formation occurs to any extent it will often be necessary to use other methods to recover most of the remaining oil from the particular field.

Heretofore a conventional procedure of determining relative permeabilities of gas and oil in a particular formation has been to secure a representative core from the particular formation. This sample or core of the formation is then cleaned up with a satisfactory solvent, as for example carbon tetrachloride or an equivalent solvent. The core is dried and saturated by water, usually by boiling in water. The core is treated with oil in order to displace most of the water and in order to restore the core to its original degree of saturation with respect to the presence of oil and water. Usually from about 60 to 80% of the water is displaced resulting in the core retaining approximately 40 to 20% of water which merely in effect decreases the porosity of the core.

The restored core containing, for example, 70% of oil and 30% of water, is then placed in a particular test cell wherein the oil is partially displaced with gas and the permeability measured at different degrees of saturation. In conventional equipment this is secured by maintaining semipermeable membranes over the ends of the core, which membrane are wetted with oil and thus prevent the flow of gas through them. While this method is satisfactory for determining the permeability of the core to gas, it is not particularly satisfactory with respect to determining the permeability to the wetting phase or oil due to the fact that the pressure drop through the membranes, which must be used in order to confine the gas in the core, is very high as compared to the pressure drop through the core itself. Thus the correction factor which must be applied to the measured oil permeability is very high as compared to the actual figure to be determined.

In accordance with the present invention air is substituted for oil as the wetting phase and a non-wetting material as for example mercury or an equivalent substance is substituted for the non-wetting phase or gas. Thus in the procedure described hereinbefore the core, which has been saturated with water, preferably by boiling, is treated with air in order to displace most of the water and restore the core to a condition equivalent to that which had existed in the subterranean area. The core then has about 60%–80% of its pore space occupied by air, and the remainder, or 40%–20% occupied by connate water. This water remains substantially undisturbed during the remainder of the process of measuring relative permeabilities. The core is then treated in the manner described below utilizing an equivalent non-wetting material, as for example mercury, in order to displace the air, and the permeability to air is then measured.

Other non-wetting materials which may be used include substances which melt at relatively low temperatures as, for example, below about 60 to 75° C. One suitable material that may be used comprises a mixture of 50% bismuth, 25% lead, 12½% tin, and 12½% cadmium, which has a melting point of 65° C. Another suitable mixture comprises 50% bismuth, 27% lead, 13% tin, and 10% cadmium, which has a melting point of about 70° C.

The direct measurement of relative permeability of a porous body to a wetting phase is of considerable importance from the standpoint of petroleum production, for the reason that such data, in conjunction with data on the relative permeability to a non-wetting phase, permit calculation of the manner in which oil and gas will be produced, in the presence of each other, from a reservoir comprising the porous medium. Reasonably satisfactory techniques are now known to the art according to which the relative permeability to a gas phase may be measured in the presence of a liquid, or wetting, phase occupying some of the pore space. The measurement of relative permeability to the liquid phase, however, involves considerable difficulty, chiefly because the gas phase tends to be expelled when liquid is flowed through a partly saturated core. If an effort is made to retain the gas by applying a semipermeable barrier to the core, the retarding effect of the barrier on the liquid flow must be taken into account, as must also the retarding effect of the interface between barrier and core.

The present invention contemplates substituting mercury for the non-wetting phase and air for the wetting phase, both under suitable experimental conditions to be outlined hereinafter. It is well known to the art that the wetting ability of mercury for almost all surfaces except metal surfaces is less than the wetting ability of air for such surfaces; or, in other words, that the contact angle measured through the air phase is very small.

The core or porous medium is first cleaned of its liquid (or solid, other than rock) contents by extraction with solvents and/or water, and drying. A vacuum is then applied, and mercury admitted under some controlled absolute pressure to the evacuated space containing the core, at which time the mercury will enter the pore space to some extent. If air is admitted to the evacuated space and the core is removed, and weighed, the gain in weight reflects the volume of mercury present in the pore spaces, which may be expressed as a fraction or percentage of the total pore space, if desired. Knowing the volume of mercury present in the pore space it is a simple matter to calculate the wetting phase saturation, i. e. the extent to which the core is saturated with air. The core in this condition is now placed in an air permeameter of a type, known to the art, which applies only a small pressure drop to the air phase. After measuring the permeability to the air, or wetting, phase, the core is reevacuated, more mercury added as described above, and the process repeated. The evacuating step is of course not necessary as pressures above atmospheric are reached in subsequent repetitions of mercury injection. In this way data can be obtained which are suitable for plotting a graph of relative permeability to the wetting phase as a function of wetting phase saturation, down to some intermediate saturation. While it is not easily possible to retain in the core a high saturation to mercury, the measurement of relative permeability is most important in the region of high wetting phase saturation, because this region is most prevalent under usual conditions obtaining in a petroleum reservoir.

It will be apparent that the relatively low viscosity of the air phase, and the relatively high viscosity of the mercury, make it feasible to attain a flow rate of air which is high enough so that it can be measured, without exerting a significant displacing effect on the mercury. This is one important advantage of the technique described above over an attempt to flow a more viscous liquid phase, if it serves as a wetting phase, without disturbing another non-wetting phase, be it either a liquid or a gas.

In summary, it can be shown that under conditions of reasonably steady flow, the distribution of fluids remains constant and is practically the same as in equivalent static conditions of equilibrium, when sufficiently small regions and periods of elapsed time are considered. That means that each fluid is offered an immobile matrix through which it can flow, and whose surface is formed partly by the rock surface and partly by interfaces.

Thus the following general procedure for the determination of the effective permeability of the wetting fluid in a two fluid system is desirable.

(a) The pore volume of a given core has to be partly filled with a comparatively very viscous material until the desired saturation is reached.

(b) This filling material has to occupy the pore space in the same way as the nonwetting phase does in the two fluid system whose permeability to the wetting fluid has to be established. That means that the filling material has to have the same or substantially equivalent contact angle with the rock as the studied two fluid sysem.

(c) The flow matrix for the wetting fluid having thus been established as a practical solid at any wanted saturation, the core may be put in a permeability cell or permeameter where its permeability to the wetting phase will be established in the normal way, by flowing air through it; and since the air will have to flow through the same matrix as the considered wetting fluid, the measured value will precisely be that of the effective permeability to the wetting fluid.

A suitable apparatus for confining the core would comprise a metal cell, such as is used for permeability measurements, having an inflatable sleeve of flexible material, such as neoprene, which can be heated to about 70° C. without substantial loss of strength or flexibility. After placing the core in the cell, one end would be temporarily closed by a solid plate, and to the other end would be applied a perforated plate communicating with a vessel of e. g. molten Woods metal. The whole apparatus would then be placed in a water bath, for example, heated to about 70° C., and after a few minutes sufficient air pressure applied to the vessel of Woods metal to force the desired quantity of melted metal into the core. After removing the apparatus from the bath and allowing to cool, the plates would be removed and replaced by other plates suitable for measuring air permeability. After measuring the permeability, the first set of plates would be replaced, the core again heated as before, and a higher pressure applied to force a higher saturation of metal into the core, after which another permeability measurement would be made, and so on, until a substantially complete curve describing relative permeability against saturation would be obtained. A satisfactory apparatus is one such as described in patent application 53,352, filed Oct. 7, 1948, for W. J. Leas, now patent No. 2,618,151, issued November 18, 1952.

It is possible that in the operation described above, in which the core is heated to about 70° C. and Woods metal forced into it, the volatility of the connate water at the somewhat elevated temperature will be sufficiently great so that some of the water will gradually vaporize. This is not a desirable circumstance, in that after partial or, possibly, even complete loss of water by vaporization, the pore space previously occupied by water will generally now be occupied by air. This is true because any water which remained unexpelled by air initially was left in the finer or smaller pore spaces, into which mercury or Woods metal will also have difficulty penetrating. Thus it will be noted that somewhat more core passages will be available to air flow than would be available to the oil, or wetting phase, flow in the oil field.

The error that is thus incurred will not be substantial, however, even if all of the connate water is lost by vaporization. This is true because the very small pores or interstices in which connate water normally resides cannot, by virtue of their relatively small size, appreciably contribute to wetting phase flow or permeability. In fact, the error has been found sufficiently small so that one simpler, and only slightly less accurate, modification of the present invention is contemplated, especially if the relative permeabilities of a great many cores are to be measured, according to which modification the first step of the process described above, that of establishing the correct quantity of connate water in the core by the restored state technique, would be omitted. According to this modification, the clean and dry, that is completely air saturated, core would be subjected at once to the penetration of mercury or Woods metal under applied pressure.

The present invention may be more fully understood by the following example illustrating the same. A sample of a porous rock formation may be saturated with water and set in contact with a semi-permeable barrier that is permeable to water only, and not to air. The pressure of the air is gradually increased, thereby removing increasing amounts of water from the core.

Alternatively, to a dry and, usually, evacuated core, mercury may be applied under gradually increasing pressure.

An operation was conducted wherein a core saturated with water was treated with gas under increasing capillary pressures. The results of this operation are tabulated as follows,

| Capillary Pressure, atmospheres | Volume Percent Water (Based on Pore Space) |
| --- | --- |
| 0.12 | 80 |
| 0.16 | 60 |
| 0.19 | 40 |
| 0.45 | 24 |

In a second operation utilizing the same core saturated with air, the air was displaced with mercury at increasingly higher capillary pressures. The capillary pressures with respect to the second operation were corrected by dividing by a factor of 5, since the product of the surface tension of mercury and the cosine of its contact angle (140°) against gases on most rock solids is approximately 5 times the corresponding values for the system air-water-rock. The capillary pressure required to cause mercury to displace gases from a pore will thus be about 5 times as great as the capillary pressure required to cause air to displace water from a pore of the same size.

After the corrections were made the corrected capillary pressures were as follows:

| ⅕ Capillary Pressure, Atm. | Percentage of Air |
| --- | --- |
| 0.13 | 80 |
| 0.14 | 60 |
| 0.22 | 40 |
| 0.45 | 24 |

From the above operations it is apparent that substantially equivalent results are secured. It therefore follows that the permeabilities of the core with respect to water, in the first illustration, and with respect to air in the second illustration are substantially equivalent.

Similar results may be obtained in the first illustration if a gas is used to displace an oil from a core originally containing a relatively high oil saturation.

Although the procedure of the present invention has been described specifically with respect to saturating the core with air and thereafter displacing some of the air with a non-wetting phase, as for example, mercury, it is to be understood that an equivalent method may be employed. For example the core may be evacuated and mercury introduced into the core in various saturations and the permeability of the core with respect to air determined at these various saturations.

Having described the invention, it is claimed:

1. A method for determining the relative permeability of a rock sample with respect to a wetting phase in the presence of a non-wetting phase which comprises placing said sample in contact, at a selected absolute pressure, with a body of liquid that has less wetting power than air for said sample, maintaining contact between said liquid and said sample for a sufficient period of time to enable said liquid to enter at least some of the pore space in said sample, removing said sample from contact with said body of liquid, ascertaining the resultant gain in weight of said sample whereby the extent of saturation by said liquid is determined, measuring the permeability of said sample to air, introducing an additional quantity of said liquid into said sample at a selected absolute pressure higher than said first absolute pressure, ascertaining the extent of saturation of said sample by said liquid by again weighing said sample, again measuring the permeability of of said sample to air, and repeating said liquid penetrating, weighing, and air permeability measuring steps a number of times, successive liquid penetrating steps being made at successively increased absolute pressures, whereby to determine the relative permeability of said sample to air as a function of the saturation of said sample by said liquid.

2. Method as defined by claim 1 wherein said liquid comprises a metal selected from the class consisting of mercury and molten metal alloys of low melting point.

References Cited in the file of this patent

UNITED STATES PATENTS

| Number | Name | Date |
|---|---|---|
| 2,293,488 | Bays | Aug. 18, 1942 |
| 2,327,642 | Horner | Aug. 24, 1943 |
| 2,345,935 | Hassler | Apr. 4, 1944 |
| 2,465,948 | Welge | Mar. 29, 1949 |
| 2,498,198 | Beeson | Feb. 21, 1950 |
| 2,604,779 | Purcell | July 29, 1952 |
| 2,641,924 | Reichertz | June 16, 1953 |